UNITED STATES PATENT OFFICE.

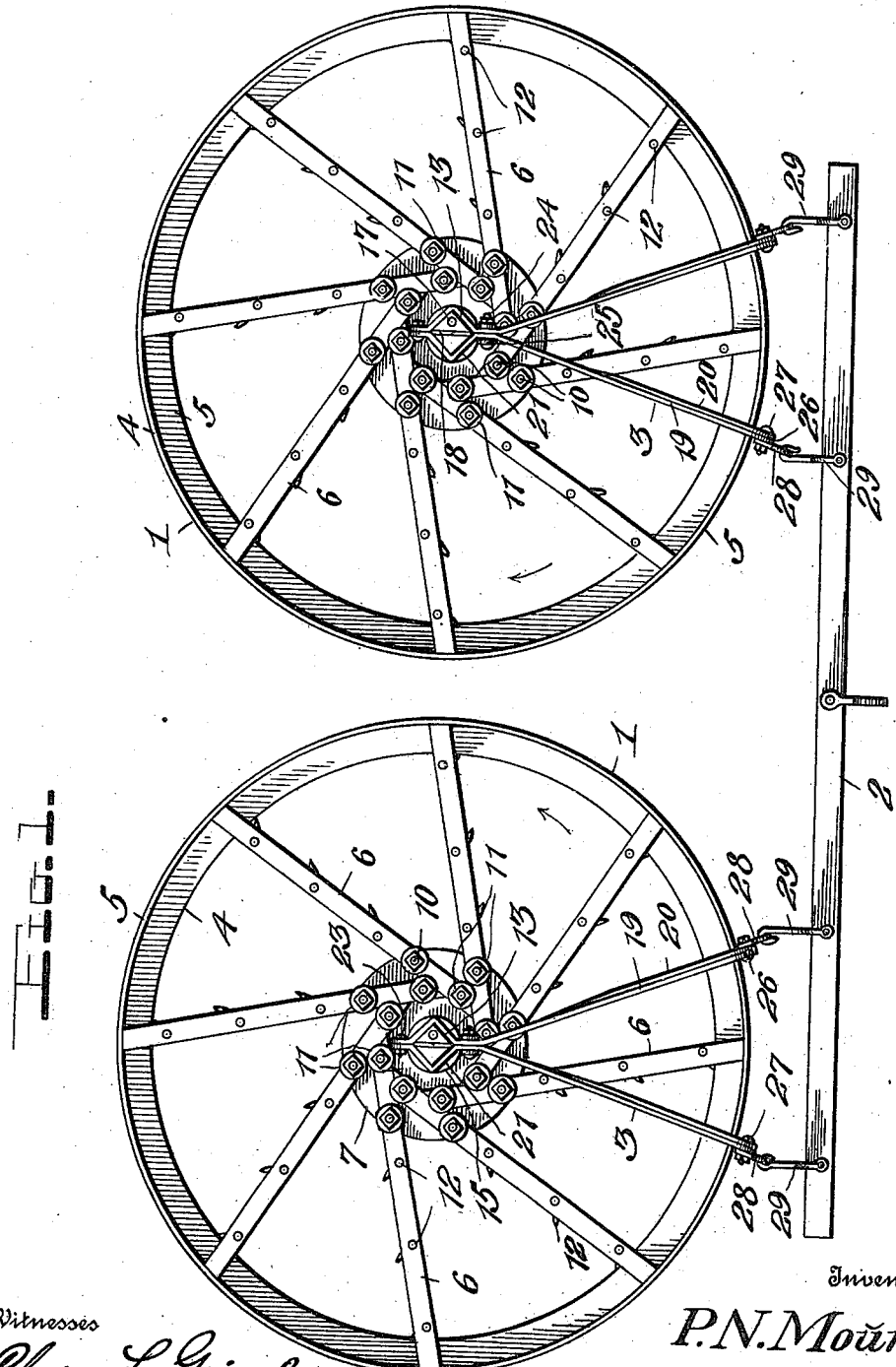

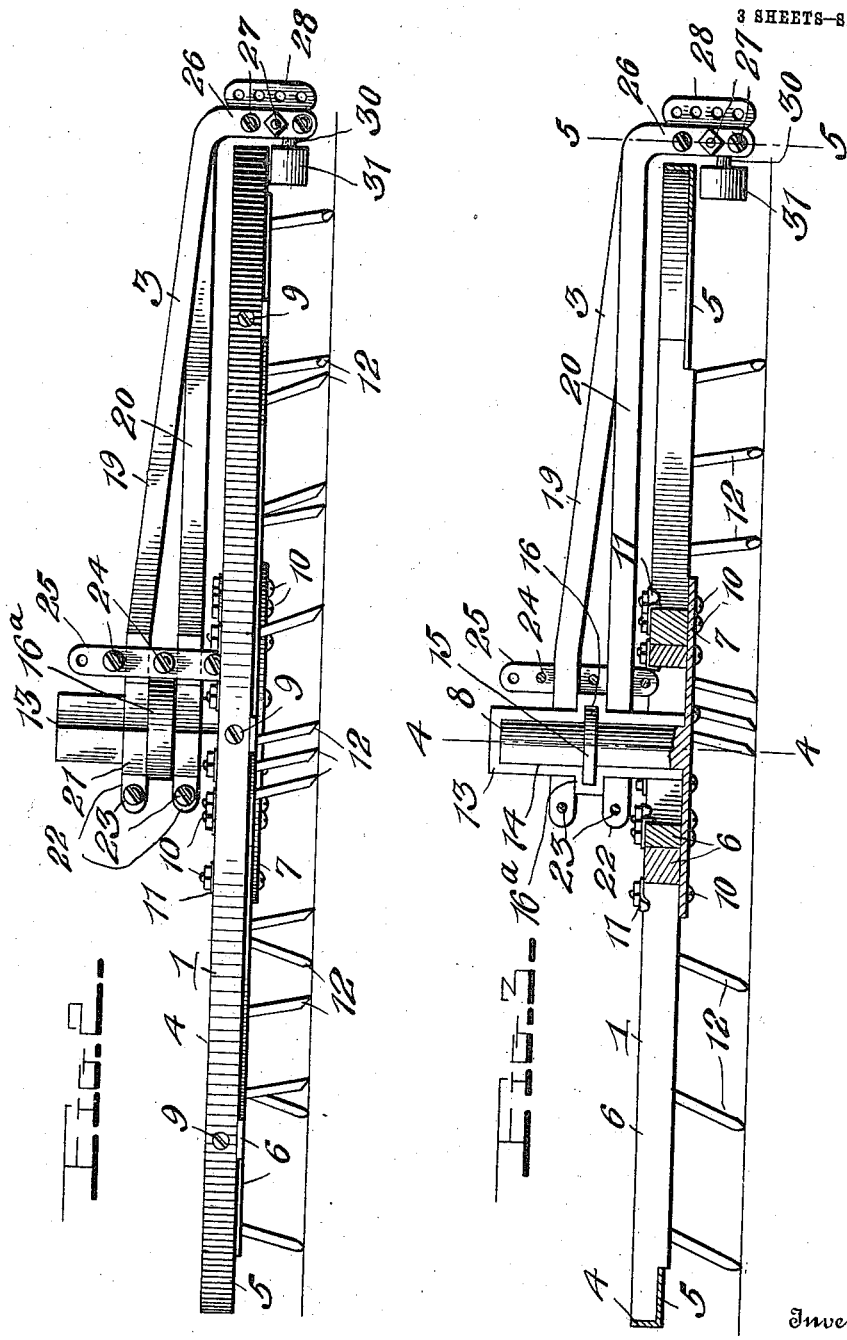

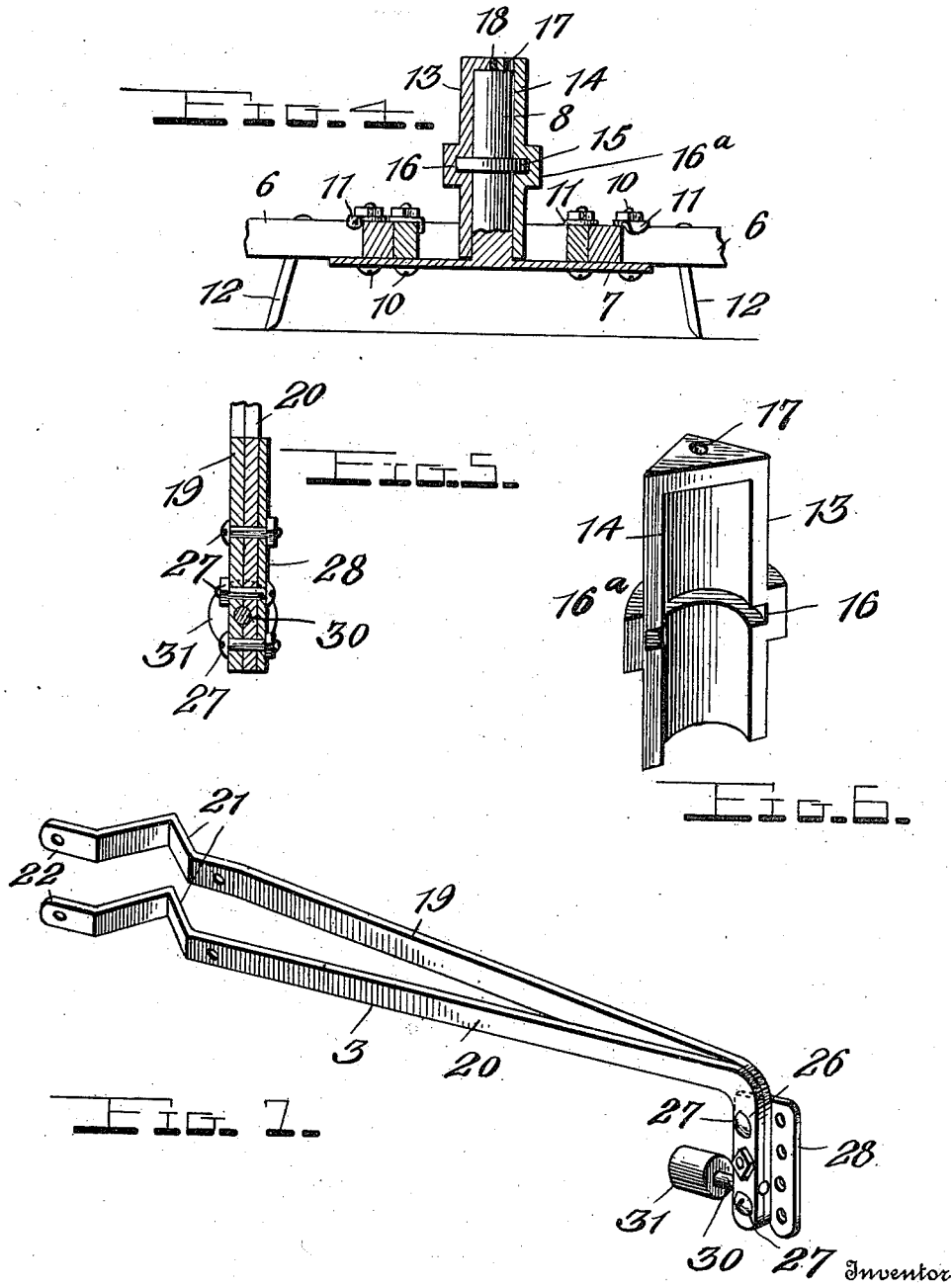

PEDER NILSEN MOUN, OF KLOTEN, NORTH DAKOTA.

ROTARY HARROW.

974,808.  Specification of Letters Patent. Patented Nov. 8, 1910.

Application filed March 19, 1910. Serial No. 550,405.

*To all whom it may concern:*

Be it known that I, PEDER NILSEN MOUN, a citizen of the United States, residing at Kloten, in the county of Nelson and State of North Dakota, have invented certain new and useful Improvements in Rotary Harrows, of which the following is a specification, reference being had to the accompanying drawings.

This invention relates to improvements in harrows, and more particularly for rotary self-cleaning harrows.

The object of the invention is to improve the construction and operation of implements of this character and thereby render them stronger and more durable and efficient.

With the above and other objects in view, the invention consists of the novel construction, combination and arrangement of parts, hereinafter fully described and claimed, and illustrated in the accompanying drawings in which:—

Figure 1 is a plan view of a two section harrow embodying my improvements; Fig. 2 is a side elevation of one of the harrow sections; Fig. 3 is a vertical sectional view through the same; Figs. 4 and 5 are detail sectional views taken respectively on the planes indicated by the lines 4—4 and 5—5 in Fig. 3; Fig. 6 is a perspective view of one of the bearing sections; and Fig. 7 is a perspective view of one of the frame members or bars.

Referring to the drawings by numeral, 1 denotes one of my improved harrow sections, any number of which may be united to an evener 2 as is common with implements of this description. As illustrated in Fig. 1 the harrow is composed of two similar sections 1, the frame portions of which are loosely connected to the evener or draft beam to which two or more draft animals are hitched. In practice I prefer to make each harrow section approximately six feet in diameter so that when a single section is used one draft animal may be employed to drag it over the ground.

Each of my improved harrows or harrow sections 1 comprises a suitable frame 3 and a rotary member or wheel 4, which latter carries substantially radial series of harrow teeth, all of which are inclined in the same direction to cause the member or wheel to rotate as it is dragged over the ground. Said member or wheel 4 preferably consists of an annular rim 5 here shown as constructed of angle metal, an annular series of substantially radial spokes 6, and a central hub member or plate 7, from the center of which rises a pivot 8. The spoke member 6 is preferably made of wooden beams which have their outer ends recessed to receive the inwardly extending horizontal flange of the angular rim 5, to which latter they are secured by fastenings 9 passed through the upstanding flange of said rim and into the extremities of the spokes. The hub member 7 is preferably in the form of a circular plate and has secured to it by bolts or similar fastenings 10 the inner ends of the spokes 6. The spokes 6 are preferably arranged as shown more clearly in Fig. 1, that is, they are substantially radially disposed and the inner extremity of each spoke abuts the adjacent side of the next adjacent spoke in the series, so that said abutting inner ends of the spokes reinforce each other. The fastenings 10 are preferably bolts and beneath their nuts I preferably arrange metallic washers 11 which have down-turned edges engaged with the sides of the spokes as shown. The harrow teeth 12 are preferably in the form of ordinary spike teeth and they are here shown as driven downwardly through the spokes. Any number of teeth may be provided in each spoke, and all the teeth in each spoke are preferably inclined both in a downward and outward direction, and also in a lateral direction to the same side of the vertical plane of the longitudinal axis of the spoke which carries them, whereby the contact of the teeth with the ground will cause the wheel to be rotated as the harrow is drawn forwardly.

The frame 3 may be of any form and construction and it carries a bearing 13 for the pivot 8. This bearing is preferably in the form of a rectangular body divided longitudinally on a diagonal plane into two half sections, the opposing faces of which have semicylindrical-shaped bearing recesses or sockets 14 for the reception of the pivot 8, the latter being a cylindrical stud rigidly united to the hub plate 7. In order to prevent longitudinal movement of the pivot in the bearing, the former has formed upon it intermediate its ends an annular flange or collar 15 which enters grooves 16 formed in the bearing recess 13 of the two half sections of the bearing, said grooves 16 being disposed within a radially projecting collar or flange 16ᵃ formed on the exterior of the bearing as shown. The upper extremity of the bearing is closed and in one of the sections may be provided an oil hole 17. This hole may be suitably covered if desired, and if desired a yieldable packing strip 18 may be provided around the edges of the opposing faces of the two half sections of the bearing to prevent the entrance of dust and dirt into the bearing.

The frame 3 is preferably composed of upper and lower pairs of frame members 19, 20, in the form of metal straps or bars, the inner ends of which are shaped to provide opposing angular clamp sections 21 which engage the angular exterior surfaces of the half sections of the bearing above and below the collar or flange 16ª thereon. Said inner extremities of the pairs of frame members or bars 19, 20, are united by transverse bolts 23, which latter draw together the clamp sections 22 at one end. The opposite ends of the clamp sections 22 are drawn together by bolts 24 arranged in vertical straps or bolts 25 which are engaged with the outer faces of the bars 19, 20, adjacent the opposite ends of said clamp sections 22, as clearly shown in the drawings. The bars or straps 19, 20, of each pair have their outer ends arranged in diverging relation and the upper bars 19 inclined downwardly and overlapping the outer extremities of the bars 20. The said overlapped ends or extremities of the bars 19, 20, are bent downwardly to provide vertical portions 26 united by transverse bolts 27, which latter also serve to connect to said bars or straps vertically disposed clevis plates 28 having vertical series of apertures for engagement by connections 29 which unite the frame to the evener 2. In order to relieve the frame 3 of strain due to the upward pull of the draft device, the depending portions or ends 26 of the bars 19, 20, carry inwardly or rearwardly projecting pins 30, on which latter are journaled anti-friction rollers 31 to contact with the bottom face of the horizontal flange of the annular rim 5. The pins or stub shafts 30 have their ends seated in opposing recesses in the portions 26 and clamped by the bolts 27 as clearly illustrated in the drawings.

From the foregoing it will be seen that my invention provides a simple and practical rotary self-cleaning harrow which may be constructed at comparatively small cost and which will be exceedingly strong and durable in use and effective in operation. It will be understood that I may attach a single draft animal to one section of the harrow, or two or more of the harrow sections may be united to an evener or eveners and drawn over the ground by a number of draft animals, or by a traction engine.

While I have shown and described in detail the preferred embodiments of the invention, it will be understood that I do not wish to be limited to the precise construction set forth, since various changes in the form, proportion and arrangement of parts, and in the details of construction, may be resorted to within the spirit and scope of the invention.

Having thus described the invention, what is claimed is:

1. A harrow comprising a frame having diverging parts with depending portions at one end, a rotary member mounted at the other end of the frame and having depending teeth and an annular rim, guiding and bracing means carried by the depending portions of the diverging parts of the frame and adapted to engage the bottom of said rim and draft attaching means on said depending portions of the parts of the frame.

2. A harrow comprising a rotary member having depending teeth, a centrally arranged upstanding pivot on said member said pivot being formed with an annular flange, a two-part bearing sleeve to fit over said pivot, said sleeve being formed with grooved portions to receive said flange, said two-part bearing sleeve having flat outer faces, a frame to extend over a portion of the member, said frame being composed of rearwardly converging pairs of bars, the bars of each pair being arranged in forward converging relation and having their front ends overlapped and their rear ends superposed and provided with clamping portions to engage the two-part bearing sleeve, fastenings uniting the clamping portions of said bars, clevis plates secured to the overlapped front ends of said bars and means carried by the said front ends of said bars to engage the bottom portion of said rotary member.

3. A harrow comprising a rotary member provided with depending teeth, a central upstanding pivot on said member said pivot being formed with an annular flange, a sectional bearing sleeve to engage said pivot, the sections of said bearing sleeve being formed intermediate their ends with an enlargement and on their inner faces with grooves to receive the flange on said pivot, and a frame having clamping portions to engage said sectional bearing sleeve above and below the enlargement on its sections.

4. A harrow comprising a frame having diverging parts with depending portions at one end, a rotary member mounted at the other end of the frame and having depending teeth and an annular rim, anti-friction rollers carried by the depending portions of the diverging parts of the frame and adapted to engage the bottom of said rim, and draft attaching means on said depending portions of the parts of the frame.

5. A harrow comprising a rotary member having depending teeth and a centrally arranged upstanding pivot, a sectional bearing to receive said pivot, and a frame to extend over a portion of said rotary member and having clamping means to engage said sectional bearing.

6. A harrow comprising a rotary member having depending teeth and a centrally arranged upstanding pivot, a sectional bearing to receive said pivot, a frame to extend over a part of said member and having at one end clamping means to engage said sectional bearing, and at its other end draft attaching means, and means at the last mentioned end of the frame to engage the bottom portion of said rotary member.

7. A harrow comprising a rotary member having correspondingly inclined depending teeth and a centrally arranged upstanding pivot, a sectional bearing to receive said pivot, a frame composed of upper and lower rearwardly converging pairs of forwardly converging members, the rear ends of said frame members having clamping portions to engage said sectional bearing, and the front ends of said frame members being downturned and overlapped, and upright clevis plates united to the last mentioned ends of the frame members.

In testimony whereof I hereunto affix my signature in the presence of two witnesses.

PEDER NILSEN MOUN.

Witnesses:
JOHN H. SCHEWE,
O. E. LOFTHUS.